May 8, 1951 M. J. SMITH 2,551,978
WIRE SCOOP
Filed April 18, 1946
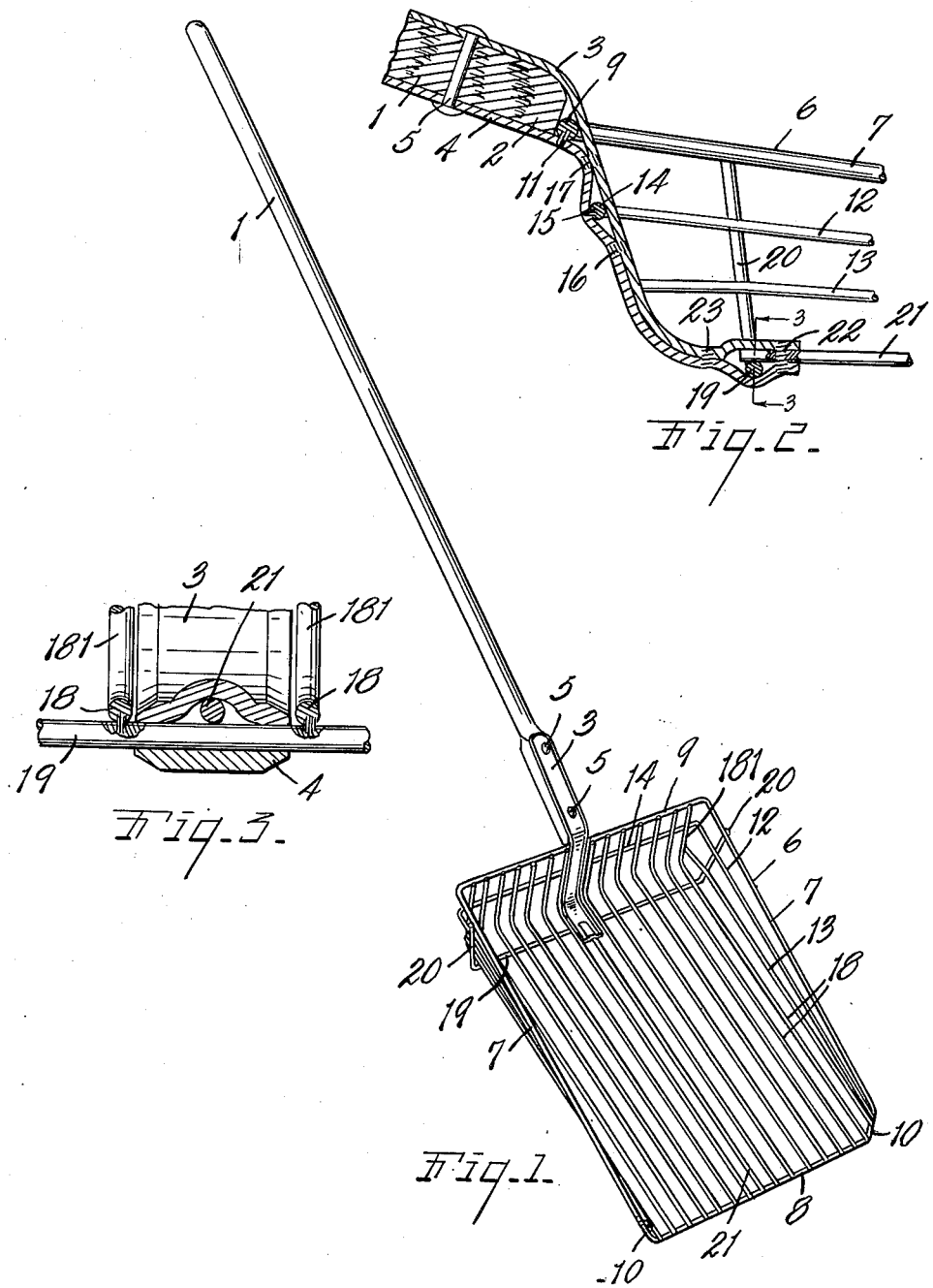
INVENTOR.
Mahlon J. Smith
BY 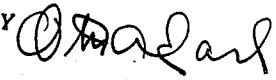
ATTORNEY Patented May 8, 1951

2,551,978

UNITED STATES PATENT OFFICE 2,551,978

WIRE SCOOP

Mahlon J. Smith, Niles, Mich., assignor to Michigan Wire Goods Company, Niles, Mich., a corporation of Michigan Application April 18, 1946, Serial No. 663,139

4 Claims. (Cl. 209—419)

This invention relates to improvements in wire scoops.

The main objects of this invention are:

First, to provide a wire scoop or shovel adapted as a sifting shovel for sifting ashes and the like or for the handling of vegetables or other materials which is rigid and durable even when formed of relatively light stock.

Second, to provide a structure of this character which may be nested for shipment or storage.

Objects relating to details and economies of the invention will appear from the description to follow. The invention is defined and pointed out in the claims.

A preferred embodiment of the invention is illustrated in the accompanying drawing, in which:

Fig. 1 is a perspective view of a scoop or shovel embodying my invention.

Fig. 2 is an enlarged fragmentary view mainly in central longitudinal section.

Fig. 3 is an enlarged fragmentary view mainly in section on a line corresponding to line 3—3 of Fig. 2.

In the embodiment of my invention illustrated in the accompanying drawing the handle 1 is formed of wood. The shank designated generally by the numeral 2 is formed of front and rear strap-like members 3 and 4 respectively, the rear ends of the members being lapped upon the top and bottom of the handle and secured thereto by rivets 5. The structure is otherwise made of wire or light rod.

I provide a border frame designated generally by the numeral 6 and comprising side members 7, 7, a front member 8, and a rear member 9. These are formed integrally of wire or light rod, the forward ends of the side members 7 being downwardly offset at 10. The front member 8 constitutes the front or nose piece of the shovel. The rear member 9 is disposed between the front and rear shank members and desirably welded thereto as indicated at 11.

I also provide intermediate and lower side members 12 and 13, the intermediate side members being connected by the rear cross piece 14 integral therewith, this cross piece being disposed between the shank members and desirably welded thereto as indicated at 15. However, a very strong clamping action results from the welding of the shank members together at 16 and 17 on either side of the member 14.

The front ends of the side members 12 and 13 are disposed upon and welded to the inner sides of the downwardly offset front ends of the side members 7.

The longitudinal slats or bars 18 are disposed in laterally spaced relation with their front ends upon and welded to the front piece 8. These bars or slats have upturned rear ends 181 disposed upon and welded to the front sides of the rear cross pieces 9 and 15.

The bottom cross piece 19 is arranged between the shank members and secured thereto adjacent their horizontally disposed front ends. This cross piece is provided with upturned ends 20 secured to the outer sides of the side members 7, 12 and 13, desirably by welding thereto.

A central longitudinal bar or slat 21 has its front end lapped upon and secured to the front piece 8 and its rear end disposed between the front ends of the shank members and welded thereto as indicated at 22, the shank members being welded at their front ends so that they cannot open or spread apart under stress. They are also welded together at 23 at the rear of the bottom cross piece.

The sides and rear ends of the shovel flare upwardly somewhat so that the shovels may be readily nested or stacked for shipment or storage.

Shovels embodying my invention are very strong and rigid even when made of comparatively light stock, the parts being disposed to coact in bracing and supporting each other.

Having thus described my invention, what I claim as new and desire to secure by Letters Patent, is:

1. In a wire scoop, the combination with a handle, of an angled shank projecting downwardly and forwardly from said handle and comprising front and rear strap-like members, a wire border frame comprising integral front, rear and side members, the front ends of the side members being downwardly offset to the front member, the rear member being secured between said shank members and bearing against the end of said handle, the front member constituting the front piece of the shovel, intermediate side members disposed in vertically spaced relation to the border frame side members, the front ends of the intermediate side members being welded to the inner sides of the downwardly offset ends of said border frame side members, the rear ends of the intermediate side members being connected by a rear cross piece integral therewith and secured between said front and rear strap-like members, laterally spaced longitudinal bars having upturned rear ends disposed in substantially parallel relation to said angled shank and in substantially a common plane therewith and on the front side of and welded to said rear border frame member and rear cross piece said rear cross piece constituting means for bracingly connecting said upturned ends to each other and to said front and rear strap-like members, the front ends of the longitudinal members being disposed upon and welded to the upper side of said border frame front member, and a central longitudinal bar having its rear end disposed between and welded to the front ends of the shank members and its front end disposed upon and welded to said border frame front member.

2. In a wire scoop, the combination with a handle, of an angled shank projecting downwardly and forwardly from said handle and comprising front and rear strap-like members, a wire border frame comprising integral front, rear and side members, the front ends of the side members being downwardly offset to the front member, the rear member being secured between said shank members, the front member constituting the front piece of the shovel, intermediate and lower side members disposed in vertically spaced relation to each other and to the border frame side members, the front ends of the intermediate and lower side members being welded to the inner sides of the downwardly offset ends of said border frame side members, the rear ends of the intermediate side members being connected by a rear cross piece integral therewith and secured between said front and rear strap-like members, laterally spaced longitudinal bars having upturned rear ends disposed in substantially parallel relation to said angled shank and in substantially a common plane therewith and on the front side of and welded to said rear border frame member and rear cross piece said rear cross piece constituting means for bracingly connecting said upturned ends to each other and to said front and rear strap-like members, the front ends of the longitudinal members being disposed upon and welded to the upper side of said border frame front member, a bottom cross piece secured between said strap-like members adjacent the front ends thereof and having upturned ends disposed on the outer sides of the said side members and welded thereto, the longitudinal bars being welded to the upper side of said bottom cross piece said bottom cross piece constituting means for bracingly connecting said members and longitudinal bars to the front ends of said strap-like members and a central longitudinal bar having its rear end disposed between and welded to the front ends of the shank members and its front end disposed upon and welded to said border frame front member.

3. In a wire scoop, the combination with a handle, of an angled shank projecting downwardly and forwardly from said handle and comprising front and rear strap-like members, a wire border frame comprising integral front, rear and side members, the front ends of the side members being downwardly offset to the front member, the rear member being secured between said shank members, the front member constituting the front piece of the shovel, other side members welded at their forward ends to the inner sides of the downwardly offset ends of said border frame side members, their rear ends being connected by a rear cross piece integral therewith and secured between said front and rear strap-like members, laterally spaced longitudinal bars having upturned rear ends disposed in substantially parallel relation to said angled shank and in substantially a common plane therewith and on the front side of and welded to said rear border frame member and rear cross piece said rear cross piece constituting means for bracingly connecting said upturned ends to each other and to said front and rear strap-like members, the front ends of the longitudinal members being disposed upon and welded to the upper side of said border frame front member, and a bottom cross piece secured between said strap-like members adjacent the front ends thereof and having upturned ends disposed on the outer sides of the said side members and welded thereto, the longitudinal bars being welded to the upper side of said bottom cross piece said bottom cross piece constituting means for bracingly connecting said side members and longitudinal bars to the front ends of said strap-like members.

4. In a wire scoop the combination with a handle, of an angled shank projecting downwardly from said handle, a wire border frame comprising integral front, rear and side members, the rear member being secured to said shank adjacent the handle, laterally spaced longitudinal bars having upturned rear ends secured to said border frame rear member and disposed substantially parallel to said angled shank and in substantially a common plane therewith, the front ends of the longtitudinal members being secured to the border frame front member, other side members secured at their forward ends to said border frame side members and having their rear ends connected by a rear cross piece integral therewith and secured to said angled shank and to said upturned rear ends of the longitudinal bars and bracingly connecting said upturned ends to each other and to the angled shank, and a bottom cross piece secured to said angled shank adjacent the lower end thereof and disposed transversely of and secured to the longitudinal members and having upturned ends secured to the border frame side members and said other side members.

MAHLON J. SMITH.

REFERENCES CITED

The following references are of record in the file of this patent:

UNITED STATES PATENTS

| Number | Name | Date |
|---|---|---|
| 144,850 | Kaestner | Nov. 25, 1873 |
| 510,765 | Besthoff | Dec. 12, 1893 |
| 1,108,270 | Staples | Aug. 25, 1914 |
| 1,257,415 | Smith | Feb. 26, 1918 |
| 2,046,534 | Smith | July 7, 1936 |